United States Patent [19]

Stephenson et al.

[11] 4,339,987
[45] Jul. 20, 1982

[54] PRESSURE DETENT MECHANISM

[75] Inventors: Dwight B. Stephenson, Hudson; David L. Koehler, Waterloo, both of Iowa

[73] Assignee: Deere & Company, Moline, Ill.

[21] Appl. No.: 203,300

[22] Filed: Nov. 3, 1980

[51] Int. Cl.³ ............................................. F15B 13/04
[52] U.S. Cl. .................................. 91/426; 137/624.27
[58] Field of Search ............................. 91/358 A, 426; 137/624.27

[56] References Cited

U.S. PATENT DOCUMENTS

| | | | |
|---|---|---|---|
| 2,276,979 | 3/1942 | Jacobi . | |
| 2,610,613 | 9/1952 | Bryant . | |
| 2,689,585 | 9/1954 | Presnell . | |
| 2,759,456 | 8/1956 | Court . | |
| 2,844,166 | 7/1958 | Edman . | |
| 3,106,065 | 10/1963 | Stacey . | |
| 3,670,628 | 6/1972 | Borer | 91/358 A |
| 3,721,160 | 3/1973 | Kittle . | |
| 3,776,099 | 12/1973 | Knutson | 91/358 A |
| 3,837,359 | 9/1974 | Nelson | 137/624.27 |
| 3,866,880 | 2/1975 | Schexnayder | 137/624.27 X |
| 3,972,264 | 8/1976 | Field | 91/358 A |
| 3,980,336 | 9/1976 | Bitonti | 137/624.27 X |
| 4,190,081 | 2/1980 | Coles | 137/624.27 |

*Primary Examiner*—Robert G. Nilson

[57] ABSTRACT

A hydraulic system includes a selective control valve and a cam member movable to selected positions for controlling a hydraulic cylinder powered by a pump. A follower is urged to a locking relationship with the cam by a hydromechanical mechanism to releasably hold the control valve in the selected positions. The hydromechanical mechanism includes a bore exposed to sump pressure and to pressure upstream and downstream from a metering valve in a passage interconnecting the pump and the control valve. A hollow apertured sleeve is movably mounted in the bore. An apertured piston is slidably received by the sleeve. A rod, engageable with the follower, extends through the piston and sleeve apertures. A first spring interconnects the rod and the piston and a second spring interconnects the piston and the sleeve. The sleeve moves to a preload position in response to a no-flow differential pressure between the sump and the passage to urge the follower via the rod towards its locking position. The piston moves in response to fluid flow through the passage to bias the follower toward its locking position. The piston and the rod move to automatically allow the follower to release from the cam when the function of the hydraulic cylinder is completed. Also, the sleeve and rod move to automatically allow the follower to release from the cam when system pressure in the passage is lost.

38 Claims, 2 Drawing Figures

PRESSURE DETENT MECHANISM

BACKGROUND OF THE INVENTION

This invention relates to a detent mechanism for holding a control valve in desired positions for controlling a hydraulic function in a hydraulic system.

U.S. Pat. No. 3,721,160 describes a detent mechanism which holds a directional control valve in a desired position and then releases when the hydraulic function is completed, such as when the hydraulic cylinder reaches the end of its stroke. This detent mechanism also increases its holding force as the flow to the cylinder increases to thereby counteract the hydraulic forces which act upon the control valve. However, the 3,721,160 detent mechanisms will not automatically release and allow the control valve to return to a neutral position when pump pressure is decreased below a threshold level, such as would occur if the prime mover for the hydraulic pump is shut off during the stroke of the hydraulic cylinder. This is due to the fact that the centering springs and hydraulic forces, acting on the control valve in this "shut off" situation, are not strong enough to overcome the locking force of the hold-in spring of the 3,721,160 detent mechanisms. Thus, with the detent mechanism of the 3,721,160 patent, the hydraulic function may be reactivated merely by restarting the prime mover and without the operator consciously repositioning the control valve to an actuating position.

SUMMARY OF THE INVENTION

An object of this invention is to provide an improved selective control valve detent mechanism.

Another object of this invention is to provide a detent mechanism wherein the detent force applied thereby is substantially of hydraulic origin.

Another object of this invention is to provide a detent mechanism with a preload position actuated by a system-sump pressure differential.

Still another object of this invention is to provide a detent mechanism, including a hydraulic responsive member, for counterbalancing the hydraulic forces acting upon the selective control valve.

A further object of this invention is to provide a detent mechanism which automatically releases to allow the control valve to return to a neutral position if system pressure is lost while a hydraulic function is in operation.

It is a further object of this invention to provide a detent mechanism with a limited response to reverse flow conditions.

Finally, it is an object of this invention to provide a force-limited, flow-compensated detent mechanism with an automatic low pressure release function.

These, and other objects, are achieved by the present invention which includes a cam and follower coupled to a lever-controlled selective control valve. A detent mechanism moves the follower to a displaced position to releasably hold the control valve in selected positions. The detent mechanism includes a housing with a bore exposed to fluid pressure in passages upstream and downstream from a metering valve. A cylindrical, open-ended sleeve is slidably mounted in the bore with an apertured end exposed to sump pressure and with the open end exposed to the system pressure in the passages. An apertured piston is slidably received by the sleeve. One side of the piston is exposed to upstream system pressure via the sleeve open end. The other piston side is exposed to downstream system pressure via radial bores in the sleeve. A flanged rod or pin is slidably mounted in the bore and extends through the apertures in the sleeve and the piston. The rod includes a pressure-responsive differential area such that system pressure urges the rod away from the follower. A pair of unequal springs, separated by the piston, are coupled between the rod flange and the open end of the sleeve. A third and weaker spring urges the sleeve towards the follower. The housing bore includes a shoulder which limits motion of the sleeve towards the follower. The sleeve includes abutments which limit motion of the piston away from and towards the follower.

DETAILED DESCRIPTION

Figure 1:
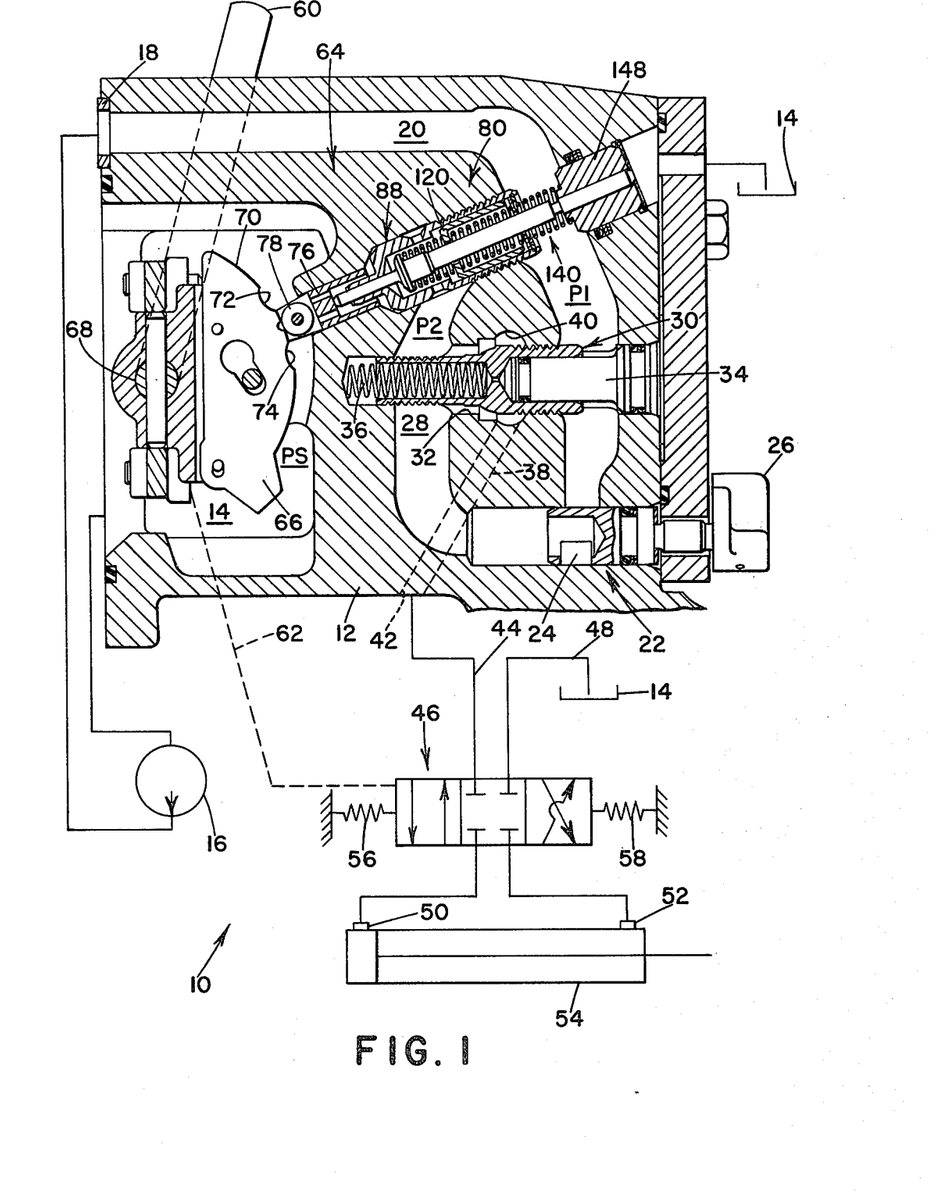
FIG. 1 is a partially schematic and sectional view of a fluid control system constructed according to the present invention.

A fluid control system 10 includes a housing 12 forming a sump cavity 14. An engine-driven pump 16 has an inlet connected to draw fluid from the sump 14 and has an outlet connected to an inlet 18 in the housing 12. Housing passage 20 connects inlet 18 with a tubular metering valve 22. Metering valve 22 includes a metering port 24 which may be selectively moved by pivoting handle 26 to vary the amount of fluid flowing from passage 20 to a further housing passage 28. Thus, housing passages 20 and 28 are upstream and downstream, respectively, of metering valve 22.

Passage 28 communicates fluid from metering valve 22 to a pressure-compensated flow control valve 30, slidably mounted in a bore 32 in housing 12. Valve 30 includes one end exposed to system pressure P1 in passage 20 and another end exposed to system pressure P2 in passage 28. Valve 30 is biased against a cylindrical stop 34 by a spring 36. Valve 30 moves in response to the fluid pressure in passages 20 and 28 to maintain a desired flow rate between passage 28 and outlet passage 38 via the annular groove 40 in bore 32, as described in assignee's U.S. Pat. No. 3,721,160.

Outlet passage 38 communicates fluid to an outlet 42 in housing 12 which, in turn, is communicated via pressure line 44 to a port of a selective control valve 46, which may be of the poppet type. Selective control valve 46 includes a second port connected to the sump 14 via a return line 48. Control valve 46 controls fluid communication from lines 44 and 48 to the work ports 50 and 52 of a hydraulic function such as the cylinder 54. Centering springs 56 and 58 are biased to urge control valve 46 to the neutral position, shown in FIG. 1, wherein fluid flow to or from cylinder 54 is prevented. Control valve 46 is movable left and right via lever 60 and schematically illustrated linkage 62 to selected active positions to retract or extend the cylinder 54.

This fluid control system 10 further includes a detent mechanism 64 for automatically and releasably retaining the control valve 46 in its selected active positions. Detent mechanism 64 includes a cam 66 located in the sump cavity 14 and secured to a shaft 68 which is fixed to the lever 60. The cam 66 pivots with the lever 60 as the lever 60 is pivoted to move control valve 46 to and from its selected positions. Cam 66 includes an arcuate surface 70 with a pair of recesses 72 and 74 formed therein. A follower element 76 is reciprocally mounted in the housing 12 for movement towards and away from the surface 70. Element 76 carries a roller 78 which follows the surface 70 of cam 66.

Figure 2:
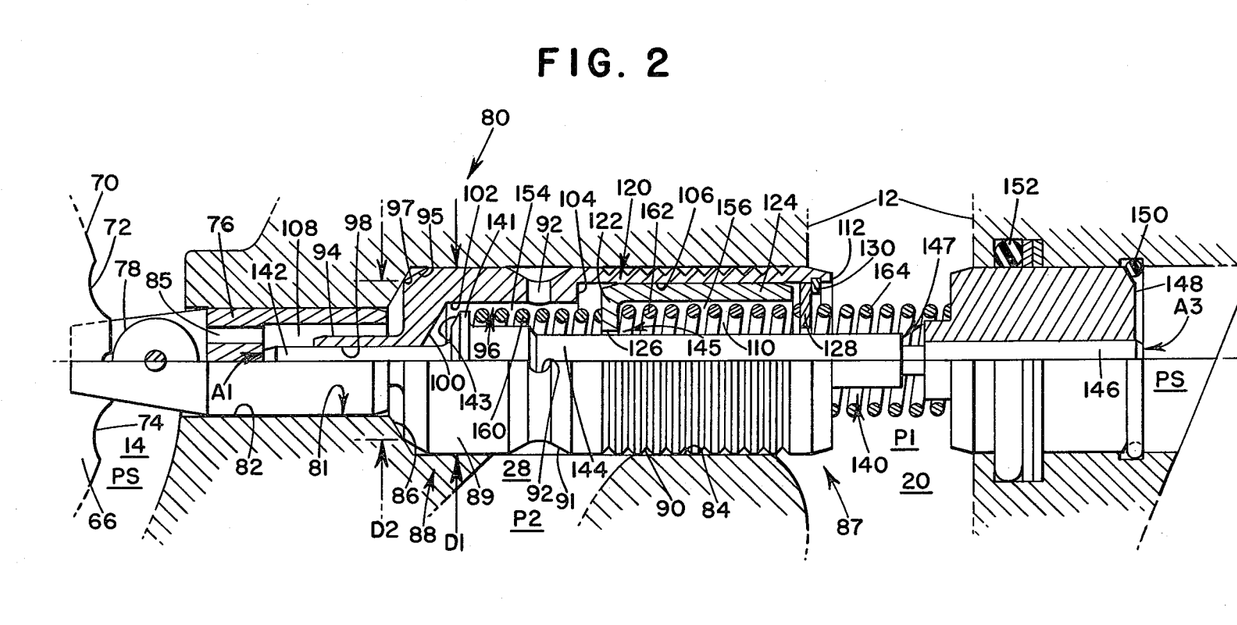
FIG. 2 is an enlarged partial sectional view of a portion of FIG. 1.

The applicant's invention also includes a hydromechanical means 80 for applying forces to the detent element 64, as best seen in FIG. 2. The hydromechanical means 80 includes a stepped bore 81 in the housing 12 with a smaller diameter portion 82 interconnected with a larger diameter portion 84 by an annular frustoconical shoulder 86. An end of the larger bore portion 84 is open to the housing passage 20. A mid-portion of bore 84 is communicated with housing passage 28. An end of the smaller bore portion 82 communicates with the sump cavity 14. The detent element 76 includes a cylindrical body slidably received by small bore portion 82. The cylindrical body has a plurality of apertures 85, (one of which is shown in FIG. 2), extending axially therethrough.

The hydromechanical means 80 further includes a cartridge assembly 87 which includes a sleeve 88. Sleeve 88 includes a hollow cylindrical body 89 which has an outer diameter D1 which is slidably positioned in large diameter housing bore portion 84. A plurality of small annular grooves 90 are formed in the outer circumferential surface of sleeve body 89 which also includes an annular slot 91 spaced apart from the grooves 90. A plurality of radial bores 92 communicate slot 91 with the interior of the sleeve body 89. Sleeve 88 also includes a neck 94 extending axially from body 89 towards detent element 76. Sleeve body 89 includes a chamfered end 95 which defines a circular edge 97 for sealing abutment against housing shoulder 86. The diameter D2 of circular edge 97 is less than the outer diameter D1 of sleeve body portion 89. A stepped bore 96 extends axially through the body 89 and neck 94 of sleeve 88. Bore 96 includes a first diameter portion 98 which extends through neck 94. A frustoconical shoulder or abutment surface 100 interconnects portion 98 with a second diameter sleeve bore portion 102. An axially facing shoulder or abutment surface 104 interconnects portion 102 with third diameter sleeve bore portion 106.

Cartridge assembly 87 further includes a piston 120 with a head 122 and a cylindrical flange portion 124 extending axially therefrom. Flange portion 124 is slidably and sealingly received by the third diameter portion 106 of the stepped bore 96 of sleeve 88. An axial bore 126 extends through the center of head 122. Piston 120 is retained within sleeve 88 by a retaining device, such as washer 128 and snap ring 130.

Cartridge assembly 87 also includes a pin or rod 140 with a first diameter portion 142, of cross-sectional area A1, slidably extending through sleeve bore portion 98 and having an end in engagement with detent element 76. A second diameter portion 144 of rod 140 extends through piston bore 126. A predetermined annular clearance 145 is maintained between the wall of piston bore 126 and the outer cylindrical surface of rod portion 144. A third diameter portion 146 of rod 140 has a cross-sectional area A3 and is slidably and sealingly received by an apertured guide 148 which is retained in the housing 12 by a snap ring 150. Cross-sectional area A3 is larger than cross-sectional area A1. O-ring 152 forms a seal between housing 12 and the guide 148 to isolate passage 20 from sump pressure Ps to which the outer end of rod portion 146 is exposed. The first and second diameter rod portions 142 and 144 are separated by a flange 141 which has a frustoconical surface 143 engageable with the shoulder 100 of sleeve 88.

Sleeve 88 and rod 140 cooperate with the wall of stepped housing bore 81 to define a first cavity 108 exposed to sump pressure (Ps) via apertures 85 in detent element 76. The annular volume between rod 140 and sleeve 88 defines a second cavity 110 exposed to the system pressure in housing passages 20 and 28 via sleeve open end 112 and via radial bores 92, respectively. Rod 140 includes shoulder 147 which is engageable with guide 148 to limit movement of rod 140 away from detent element 76.

The piston 120 and the rod 140 cooperate to divide the cavity 110 in the interior of sleeve 88 into a first chamber 154 communicated with the downstream system pressure P2 in passage 28 via radial bores 92 and a second chamber 156 communicated with the upstream system pressure P1 in passage 20 via the open end 112 of sleeve 88. Thus, areas A1 and A3 are exposed to sump pressure Ps at opposite ends of the rod 140, while the middle rod portion between rod portions 142 and 146 is exposed to the system pressure P1 or P2 in cavity 110.

A first resilient member or spring 160, with a spring constant K1, is disposed within the first chamber 154 and is held under compression between the flange 141 of rod 140 and the head 122 of piston 120. A second resilient member or spring 162, with a spring constant K2 (smaller than K1), is disposed within second chamber 156 and is held under compression between the piston head 122 and the washer 128. The length and spring constants K1 and K2 of springs 160 and 162 are chosen so that the head 122 of piston 120 is normally held spaced apart from abutment 104 of sleeve 88. A relatively weak third resilient member or spring 164 is held under compression between washer 128 and guide 148.

Mode of Operation

First, assume that the engine, (not shown), is not operating so that the engine-driven pump 16 is not pumping. Also, assume that the lever 60 and the control valve 46 are in the neutral position so that fluid flow to and from cylinder 54 is prevented. It follows that there is no fluid flowing through housing passages 20 and 28 and that the pressures therein and in cavity 108 and in chambers 154 and 156 are equal and at sump pressure. In this case, the cartridge assembly 87 is in a neutral-off position, (not shown), wherein both springs 160 and 162 are expanded to the maximum extent possible, forcing sleeve abutment surface 100 against pin shoulder 143 and thus holding sleeve sealing edge 97 spaced apart from housing shoulder surface 86. As previously described, springs 160 and 162 are selected so that the head 122 of piston 120 is spaced apart from sleeve shoulder surface 104. In this neutral-off situation, the entire force of springs 160 and 162 is absorbed by the sleeve 88 between its abutment surface 100 and washer 128, and none of the force of springs 160 and 162 is transmitted to the detent element 76. The end of rod portion 142 is held lightly against detent element 76 by only the relatively weak spring 164 so that the only force holding roller 78 against cam surface 70 is provided by the weak force of spring 164. The force from spring 164 is so weak that it alone is not sufficient to hold the lever 60 and cam 66 in a position where the roller 78 engages either of recesses 72 or 74 against the force of the centering springs 56 and 58. Thus, when the pump 16 is off and there is no flow in passages 20 and 28, the centering springs 56 and 58 will return valve 46, lever 60 and cam 166 to the neutral position wherein the roller 78 is forced out of the recesses 72 and 74.

Now, assume that the engine, (not shown), is started so that the engine-driven pump 16 beings to operate, but that the lever 60 and the control valve 46 are still in the neutral position. As the pump 16 begins to operate, the system pressure in passages 20 and 28 increases, but since there is no flow to cylinder 54, there is no pressure drop across metering valve 22, and thus, the fluid pressure is still equalized between passages 20 and 28 and between chambers 154 and 156 upstream and downstream from metering valve 22. There is, however, a pressure differential between the system pressure in passages 20 and 28 and the sump pressure Ps in chamber 108, since chamber 108 is exposed to sump pressure via passages 85. This pressure differential provides a hydraulic preload force by moving the sleeve 88 towards the cam 66 to a preload position, (shown in FIGS. 1 and 2), wherein sleeve abutment surface 100 is pulled away from rod surface 143, springs 160 and 162 are compressed between flange 141 and washer 128, and the sealing edge 97 sealingly engages housing shoulder surface 86. This sealing engagement prevents fluid leakage flow around the outer surface of sleeve 88 and aids the further buildup of the pressure differential between chamber 108 and passages 20 and 28. The compression of springs 160 and 162 produces the preload force which acts through rod flange 141, rod portion 142 and detent element 76 to urge roller 78 towards cam 166. It should be noted that this preload force is larger than the initial biasing force of spring 164 during the neutral-off position previously described. It should also be noted that this preload force is due to the movement of sleeve 88 in response to the pressure differential between the sump pressure Ps in cavity 108 and the higher system pressure in passages 20 and 28 rather than due to spring 164. The rod 140 is subject to a hydraulic rod release force which tends to move rod 140 away from cam 66. This hydraulic rod release force is caused by the pressure differential between system and sump pressures (P1-Ps) acting the area differential between rod areas A3 and A1. This hydraulic rod release force is substantially exceeded by the preload force just described, so that the rod 140 is strongly held against the detent element 76. It should also be noted that the sleeve 88 would also move to the preload position if the pump 16 were started while the operator manually holds the control valve 46 in an active, flow-producing position.

Now, assume that while the cartridge assembly 87 is in the preload position just described, the lever 60, cam 66 and control valve 46 are moved by the vehicle operator to one of their selected active positions wherein fluid begins to flow to or from cylinder 54 and one of the recesses, 72 or 74, is positioned to receive roller 78. In this case, the preload force immediately urges the roller 78 into locking engagement with one of the recesses 72 or 74 while springs 160 and 162 expand a small amount as the roller 78 moves into the recess while the sleeve 88 remains in the preload position.

With the control valve 46 in an active position, fluid begins to flow through passages 20 and 28 and the control valve 46 is subject to a hydraulic valve release force which tends to urge control valve 46 back to its neutral position. This hydraulic valve release force increases as the rate of flow increases. However, this fluid flow also creates a differential pressure across the metering valve 22 so that the upstream system pressure (P1) in passage 20 is higher than the downstream system pressure (P2) in passage 28. The upstream pressure P1 is communicated to chamber 156 via the end 112 of sleeve 88 and the opening in washer 128. The downstream pressure P2 is communicated to chamber 154 via slot 91 and radial bores 92. This differential pressure (P1-P2) between chambers 156 and 154 provides a hydraulic locking force by causing piston 120 to move to the left, (viewing FIG. 2), thereby compressing spring 160 and increasing the amount of force on flange 141 which acts through rod 140 and detent element 76 to hold roller 78 within recess 72 or 74. As the rate of flow increases, the differential pressure (P1-P2) increases, (for a particular setting of metering valve 22), and so does the hydraulic locking force. This increased hydraulic piston locking force compensates for the increased hydraulic valve release force and prevents control valve 46 from inadvertently moving to its neutral position. It should be noted that the sleeve 88 remains in the preload position after the control valve 46 is moved to an active position. Thus, in the active mode, the combined locking force is comprised of the hydraulic preload force and the hydraulic piston locking force. The combined release force is comprised of the centering spring forces, the hydraulic rod release force and the hydraulic valve release force. In this active mode, the combined locking force is greater than the combined release force to prevent inadvertent release of the detent mechanism 64. Furthermore, the flow-produced locking forces are generated within a time interval which is shorter than the reaction time of the vehicle operator so that he need not consciously hold the control lever 60 in the active position while waiting for the hydraulic locking forces to build up to a level sufficient to overcome the combined release forces.

If not otherwise limited, this increasing hydraulic locking force could make it difficult for the vehicle operator to manually override the detent mechanism 64 by shifting lever 60, cam 66 and control valve 46 back to their neutral positions. However, the applicant's invention provides means for limiting this hydraulic locking force by the provision of the annular shoulder 104 on the sleeve 88. For example, as the piston 120 moves to the left in response to the increasing pressure differential (P1-P2), the piston head 122 eventually engages annular shoulder surface 104 of the sleeve 88. At this point, further compression of spring 160 is prevented and the force on the piston 120, due to further increases in the differential pressure, (P1-P2), is transferred to the housing 12 via the engagement of piston head 122 with shoulder 104 and the engagement of sleeve surface 97 with housing surface 86. The shoulder 104 thus limits the compression of spring 160 and limits the hydraulic locking force previously described. Piston head 122 engages shoulder 104 before spring 160 is fully compressed, so that rod 140 may move to the right, (viewing FIG. 2), to allow roller 78 to release from recess 72 or 74 during a manual override without also having to move piston 120 away from shoulder 104 against the differential pressure (P1-P2).

High differential pressures (P1-P2) between chambers 156 and 154 may occur as a result of the setting of metering valve 22 for low flow rates. An annular clearance 145 between the piston 120 and the rod portion 144 is provided to prevent binding of pin 140 and piston 124 and to allow minimum flow rate even when metering valve 22 is completely closed.

It is possible to lose the system pressure from pump 16 while the control valve is in its active positions and while fluid is flowing to or from the cylinder 54. This pressure loss could result when the engine stops operating while the cylinder 54 is being actuated. In this case, then, the differential between pressures P1 and P2 decreases and both pressures P1 and P2 approach sump pressure Ps. As the differential pressure (P1-P2) decreases, the piston 120 moves to the right, allowing spring 160 to expand and reduce the hydraulic piston locking force previously described. Similarly, when pressures P1 and P2 reach a predetermined lower limit, then the system-sump differential pressure acting upon diameter D2 of sleeve 88 is not enough to hold sleeve edge 97 against housing shoulder 86 against the force of springs 160 and 162. Thus, sleeve edge 97 moves away from shoulder 86 and increases leakage flow between cavity 110 and cavity 108 around the outer surface of sleeve 88. This increased leakage further reduces the system-sump pressure differential and assures that sleeve 88 will continue to move away from shoulder 86, to expand springs 160 and 162, until sleeve abutment surface 100 engages rod surface 143, at which point the entire force of springs 160 and 162 is again contained between sleeve abutment surface 100 and washer 128. At this point, springs 160 and 162 no longer urge the end of rod portion 142 against detent element 76 and thus, the preload force, previously described, is released. The elimination of the preload force and of the hydraulic piston locking force allows the centering springs 56 and 58 to automatically move control valve 96, lever 60 and cam 66 back to the neutral position without any conscious effort by the vehicle operator. This prevents accidental actuation of the cylinder 54 if pump pressure is regained when the vehicle operator restarts the vehicle engine.

When the cylinder 54 reaches the end of its stroke, during normal operation, then the fluid flow through control valve 46 and through passages 20 and 28 ceases and pressure P2 approaches P1 as the differential pressure (P1-P2), across metering valve 22, decreases. This causes the piston 120 to move and permit expansion of spring 160, thus terminating the hydraulic piston locking force previously described, so that only the preload locking force remains to resist movement of cam 66 to the neutral position. The lack of fluid flow also terminates the hydraulic valve flow release force. However, since the pump 16 is still operating, the rod 140 is still subject to the rod release force previously described. Thus, at the end of stroke, the combined release force is comprised of the centering spring force and the hydraulic pin release force. This combined release force is larger than the remaining preload locking force so that the lever 60, the cam 66 and the control valve automatically return to the neutral position forcing the roller 78 out of the cam recess 72 or 74 at the end of the piston stroke.

As the cam 66 begins to pivot during release so that the roller 78 is forced out of the recesses 72 or 74, the effective release force acting on roller 78 increases due to the angular position change in the point at which the roller 78 engages cam surface 70. The effective release force increase is larger than the additional hold-in force due to the compression of spring 160 and 162 by the movement of roller 78 out of the recesses. Thus, once a release is initiated, it will follow through to completion.

A potential reverse flow release condition may occur if an additional hydraulic cylinder (not shown), requiring less pressure than cylinder 54, is rapidly actuated through a parallel valve connected to the same pressure source while the control valve 46 is operating cylinder 54. It would be desirable to have the detent mechanism hold the control valve 46 in the actuated position during this condition, so that the operator does not have to reactivate control valve 46 when the condition terminates. During this reverse flow condition, system pressure may drop rapidy and fluid may flow through the metering valve 22 in the reverse direction, producing a pressure differential which tends to move piston 120 away from cam 66 and expand spring 160, thus reducing the hydraulic piston locking force and tending to release the detent mechanism. However, in the applicant's invention, this undesirable release is prevented due to the axially extended flange portion 124 of piston 120. The end of the flange portion 124 is engageable with washer 128 to thereby limit the movement of piston 120 away from cam 66 and to thereby limit the expansion of spring 160. As long as the system pressure during this reverse flow condition is sufficient to hold the sleeve 88 against shoulder 86, then the limited expansion of spring 160 maintains at least a predetermined locking force to prevent release of the detent mechanism during this reverse flow condition.

We claim:
1. In a hydraulic system having a source of fluid pressure, a sump, a control valve having selected positions for controlling fluid communication between the source, the sump and a fluid motor, passage means for communicating fluid between the source and the control valve, detent means movable to a locking position for releasably holding the control valve in at least one of the selected positions, and hydromechanical means coupled to the detent means for urging the detent means to the locking position and for resisting movement of the control valve out of the at least one selected position, the hydromechanical means comprising:

a housing defining a walled bore in communication with the passage means and the sump;

a sleeve movably mounted in the bore; and a rod movably mounted in the bore, coupled to and received by the sleeve, and engageable with the detent means, the sleeve, the bore and the rod cooperating to define a first cavity communicated with the sump and a second cavity communicated with the passage means, the sleeve being movable in response to a differential pressure between the first and second cavities to urge the rod towards the detent means to thereby bias the detent means towards its locking position.

2. The invention of claim 1, wherein:
the housing bore includes larger and smaller diameter portions interconnected by a shoulder, the shoulder being engageable with the sleeve to limit its motion towards the detent means.

3. The invention of claim 1, further comprising:
a piston movably mounted on the rod and slidably received by the sleeve; and
a first resilient member coupled between the rod and the piston, the piston being movable in response to fluid flow through the passage means to compress the first resilient member and to urge the rods towards the detent means to bias the detent means towards its locking position.

4. The invention of claim 3, further comprising:
a second resilient member coupled between the piston and the sleeve, the piston and the first and second resilient members cooperating to couple the sleeve with the rod.

5. The invention of claim 4, further comprising:
a third resilient member coupled between the housing and the rod and biased to maintain the rod in engagement with the detent means.

6. The invention of claim 3, wherein:
a metering valve divides the passage means into portions upstream and downstream therefrom, the piston and the rod cooperating to divide the second cavity into a first chamber communicated with the downstream portion and a second chamber communicated with the upstream portion, fluid flow through the passage means creating a pressure drop across the piston, the piston being movable in response to the pressure drop to compress the first resilient member, the compressed first resilient member having an increased biasing force which urges the detent means towards the displaced position.

7. The invention of claim 1, wherein the detent means comprises:
a cam coupled for movement with the control valve, the cam having at least one recess in a surface thereof; and
a follower engageable with the cam and coupled to the hydromechanical means, the follower being received by the at least one recess when the control valve is in the at least one selected position.

8. In a hydraulic system having a fluid pressure source, a sump, a fluid motor, passage means for communicating fluid between the fluid motor and the source, a control valve means coupled to the passage means and having selected positions for controlling fluid communication between the fluid motor and the source, the control valve means having a neutral position wherein fluid communication between the source and the fluid motor is prevented, the hydraulic system further having detent means movable to a locking position for releasably holding the control valve means in at least one of the selected positions, and having fluid-actuated means coupled to the detent means for urging the detent means to the locking position and for resisting movement of the control valve means out of at least one of the selected positions, the fluid-actuated means comprising:
a rod engageable with the detent means; and
a pressure-responsive means coupled to the rod and exposed to fluid pressure in the passage means and to sump pressure for movement to a preload position in response to a differential pressure between the passage means and the sump when the control valve means is in the neutral position and for biasing the rod to urge the detent means towards its locking position when the pressure-responsive means is in the preload position.

9. The invention of claim 8, further comprising:
a housing having a walled bore in communication with the sump and the passage means, the rod being movably mounted in the bore, the pressure-responsive means comprising a sleeve movably mounted in the bore, the sleeve, rod and bore cooperating to define a first cavity communicated with the sump and a second cavity communicated with the passage means, the differential pressure being developed between the first and second cavities.

10. In a hydraulic system having a source of fluid pressure, a sump, a control valve having selected positions for controlling fluid communication between the source, the sump and a fluid motor, passage means for communicating fluid between the source and the control valve, detent means movable to a locking position for releasably holding the control valve in at least one of the selected positions, and pressure-responsive means coupled to the detent means for urging the detent means to the locking position and for resisting movement of the control valve out of the at least one selected position, the pressure-responsive means comprising:
a housing defining a walled bore in communication with the passage means;
a rod movably mounted in the bore and engageable with the detent means;
a piston movably mounted on the rod and movably mounted in the bore; and
a resilient member interconnecting the piston and the rod, the piston being movable to bias the resilient member in response to fluid flow through the passage means, the biased resilient member urging the rod towards the detent means to urge the detent means to its locking position.

11. In a hydraulic system having a source of fluid pressure, a sump, a control valve having selected positions for controlling fluid communication between the source, the sump and a fluid motor, passage means for communicating fluid between the source and the control valve, detent means movable to a locking position for releasably holding the control valve in at least one of the selected positions, and pressure-responsive means coupled to the detent means for urging the detent means to the locking position and for resisting movement of the control valve out of the at least one selected position, the pressure-responsive means comprising:
a housing defining a walled bore in communication with the passage means;
a rod movably mounted in the bore and engageable with the detent means;
a piston coupled to the rod, mounted in the bore and movable therewith towards the detent means in response to a forward fluid flow in the passage means to urge the detent means towards its locking position via the rod; and
stop means positioned within the bore and engageable with the piston for limiting movement of the piston towards the detent means.

12. The invention of claim 11, further comprising:
further stop means positioned within the bore and engageable with the piston for limiting movement of the piston away from the detent means in response to a reverse fluid flow through the passage means and for maintaining a minimum bias on the detent means.

13. The invention of claim 11, further comprising:
a sleeve mounted in the bore and coaxially surrounding the rod and the piston, the sleeve carrying a stop at one end thereof;
the piston being coupled to the rod through a first resilient member, the piston being coupled to the stop through a second resilient member, the piston, the resilient members and the stop cooperating to couple the sleeve with the rod; and
the sleeve and the rod cooperating with the bore to define a first cavity communicated with the sump and a second cavity communicated with the passage means, the sleeve being movable in response to a differential pressure between the first and second cavities to compress the resilient members, the compressed resilient members biasing the detent means towards its locking position via the rod.

14. The invention of claim 11, wherein:
a metering valve divides the passage means into portions upstream and downstream thereof; and
the piston, the sleeve and the rod cooperate to define a first chamber communicated with the downstream portion of the passage means and a second chamber communicated with the upstream portion of the passage means, fluid flow through the passage means creating a differential pressure between the first and second chambers, the piston being movable to urge the detent means towards its locking position in response to this differential pressure.

15. The invention of claim 14, wherein:
the sleeve and the rod cooperate to define an annular cavity therebetween communicated with the passage means, the piston cooperating with the rod and the sleeve to divide the annular cavity into the first and second chambers.

16. The invention of claim 14, wherein:
the sleeve includes a radial passage communicating the first chamber with the downstream portion of the passage means.

17. The invention of claim 14, wherein:
the sleeve includes an opening at an end thereof for communicating the second chamber with the upstream portion of the passage means.

18. The invention of claim 14, wherein:
the piston is coupled to the rod by a first resilient member located in the first chamber and which includes a first end engaging the rod and a second end engaging the piston.

19. The invention of claim 18, wherein:
the sleeve includes a stop at an end thereof; and
a second resilient member is positioned in the second chamber and includes a first end engaging the piston and a second end engaging the stop, the piston, the first and second resilient members and the stop cooperating to couple the sleeve with the rod.

20. In a hydraulic system having a source of fluid pressure, a sump, a control valve having selected positions for controlling fluid communication between the source, the sump and a fluid motor, passage means for communicating fluid between the source and the control valve, detent means movable to a locking position for releasably holding the control valve in at least one of the selected positions, and pressure-responsive means coupled to the detent means for urging the detent means to the locking position and for resisting movement of the control valve out of the at least one selected position, the pressure-responsive means comprising:
a housing defining a walled bore in communication with the passage means;
a sleeve movably mounted in the bore;
a piston slidably received by the sleeve and including an axial bore extending therethrough;
a rod movably mounted in the bore, received by the sleeve, received by the axial bore in the piston and engageable with the detent means; and
a first resilient member coupled between the piston and the rod, the piston being movable to bias the first resilient member in response to fluid flow through the passage means, the biased first resilient member cooperating with the rod to urge the detent means towards its displaced position.

21. The invention of claim 20, wherein:
a second resilient member interconnects the sleeve and the piston and is biased to urge the piston towards the detent means, a portion of the piston being disposed between the first and second resilient members.

22. In a hydraulic system having a source of fluid pressure, a sump, a hydraulic function, passage means for communicating fluid between the source and function and the function and sump, control valve means having selected positions for controlling fluid flow through the passage means to and from the function, detent means movable to a locking position for releasably holding the valve means in at least one of the selected positions, and pressure-responsive means engaging the detent means for urging the detent means to the locking position and resisting movement of the valve means out of the at least one selected position, the pressure-responsive means comprising:
a housing defining a walled bore in communication with the passage means between the source and valve means;
a piston slidably mounted in the bore responsive to fluid pressure in the passage means between the source and valve means to move toward the detent means;
the piston including a head portion having an aperture extending therethrough;
a rod slidably extending through the aperture and having an end in engagement with the detent means; and
resilient means interconnecting the piston and rod for yieldably urging the rod against the detent means and the detent means toward its locking position in response to movement of the piston toward the detent means.

23. The invention of claim 22 wherein a metering valve divides the passage means between the source and control valve means into portions upstream and downstream thereof so that fluid flow through the passage means creates a pressure differential between the upstream and downstream portions of the passage means, and the walled bore is in communication with the upstream and downstream portions of the passage means on opposite sides of the piston whereby the piston will move in the bore in response to the pressure differential in the upstream and downstream portions of the passage means.

24. The invention of claim 23 further including stop means in the bore to limit movement of the piston and thereby limit the force on the detent means.

25. In a hydraulic system having a source of fluid pressure, a sump, a hydraulic function, passage means for communicating fluid between the source and function and the function and sump, control valve means having selected positions for controlling fluid flow through the passage means to and from the function, metering valve means dividing the passage means between the source and control valve means into upstream and downstream portions, detent means movable to a locking position for releasably holding the valve means in at least one of the selected positions, and pressure-responsive means engaging the detent means for urging the detent means to the locking position and resisting movement of the valve means out of the at least one selected position, the pressure-responsive means comprising:
a housing defining a walled bore in alignment with the detent means and having first and second ends in communication with the upstream portion of the passage means and the sump, respectively;

a tubular body slidably mounted in the bore and having an open end communicating with the upstream portion of the passage means and a necked end communicating with the sump and having a rod receiving opening therethrough;

a rod slidably and sealingly extending through the opening in the necked end of the tubular body and having one end in engagement with the detent means;

said rod having an enlarged portion located within the tubular body;

a piston having an apertured head slidably mounted on the rod and in the tubular body between the open end of the tubular body and the enlarged portion of the rod;

first stop means carried by the tubular body preventing movement of the piston out of the open end thereof;

first spring means positioned between the piston and the enlarged portion of the rod;

second spring means positioned between the stop means and the piston;

aperture means extending through the tubular body between the necked end thereof and the piston; and means providing communication between the downstream portion of the passage means and the aperture means.

26. The invention of claim 25 wherein second stop means in the bore limits the movement of the tubular body toward the detent means.

27. The invention as set forth in claim 26 wherein third stop means within the tubular body limits movement of the piston toward the detent means.

28. The invention as set forth in claim 25 wherein the first and second spring means are of sufficient length to move the necked portion of the tubular body into engagement with the enlarged portion of the rod.

29. The invention of claim 28, wherein second stop means in the bore limits the movement of the tubular body toward the detent means.

30. The invention as set forth in claim 29 wherein third stop means within the tubular body limits movement of the piston toward the detent means.

31. In a hydraulic system having a source of fluid pressure, a sump, a control valve having selected positions for controlling fluid communication between the source, the sump and a fluid motor, passage means for communicating fluid between the source and the control valve, detent means movable to a locking position for releasably holding the control valve in at least one of the selected positions, and hydromechanical means for urging the detent means to the locking position and for resisting movement of the control valve out of the at least one selected position, the hydromechanical means comprising:

a housing defining a walled bore in communication with the passage means and the sump; and a pressure-responsive apparatus movably mounted in the bore, coupled to the detent means, and including an apertured sleeve movably mounted in the bore and a rod movably mounted in the bore, engageable with the detent means, coupled to the sleeve and received by the aperture therein, the sleeve, bore and rod cooperating to define a first cavity communicated with the sump and a second cavity communicated with the passage means, the sleeve being movable toward the detent means in response to a differential pressure between the first and second cavities to urge the rod towards the detent means to bias the detent means towards the locking position.

32. The invention of claim 31, wherein:

the housing bore includes larger and smaller diameter portions interconnected by a shoulder, the shoulder being engageable with the apparatus to limit its motion in response to the differential pressure to thereby limit the bias on the detent means.

33. The invention of claim 31, wherein;

a piston is movably mounted on the rod and slidably received by the sleeve; and a first resilient member interconnects the rod and the piston, the piston being movable in response to fluid flow through the passage means to compress the first resilient member and to urge the rod towards the detent means to bias the latter towards its locking position.

34. The invention of claim 33, wherein:

a second resilient member interconnects the piston and the sleeve, the piston and the first and second resilient members cooperating to couple the sleeve with the rod.

35. The invention of claim 34, further comprising:

a third resilient member coupled between the housing and the rod and biased to maintain the rod in engagement with the detent means.

36. The invention of claim 33, wherein:

a metering valve divides the passage means into portions upstream and downstream therefrom, the piston and the rod cooperating to divide the second cavity ino a first chamber communicated with the downstream portion and a second chamber communicated with the upstream portion, fluid flow through the passage means creating a pressure drop across the piston, the piston being movable in response to the pressure drop to compress the first resilient member, the compressed first resilient member having an increased biasing force which urges the detent means towards the locking position.

37. The invention of claim 31, wherein the detent means comprises:

a cam coupled for movement with the control valve, the cam having at least one recess in a surface thereof; and a follower engageable with the cam and coupled to the hydromechanical means, the follower being received by the at least one recess when the control valve is in the at least one selected position.

38. The invention of claim 31, wherein:

the rod includes a first axial end face defining a first pressure-responsive area exposed to sump pressure in the first cavity, an opposite axial end face defining a second pressure-responsive area exposed to sump pressure and a mid-portion interconnecting the first and opposite end faces extending through the second cavity and exposed to system pressure therein, the rod being biased to move away from the detent means in response to fluid pressure acting upon the mid-portion and upon the first and second pressure-responsive areas.

* * * * *

UNITED STATES PATENT AND TRADEMARK OFFICE
CERTIFICATE OF CORRECTION

PATENT NO. : 4,339,987

DATED : July 20, 1982

INVENTOR(S) : Dwight B. Stephenson and David L. Koehler

It is certified that error appears in the above-identified patent and that said Letters Patent is hereby corrected as shown below:

Column 8, line 63, delete "rods" and insert -- rod --.

Column 14, line 36, delete "ino" and insert -- into --.

Signed and Sealed this

Fourteenth Day of December 1982

[SEAL]

Attest:

GERALD J. MOSSINGHOFF

Attesting Officer     Commissioner of Patents and Trademarks